JASPER S. CHANDLER
INVENTOR.

ATTORNEYS

Nov. 16, 1971          J. S. CHANDLER          3,620,146
COMPACT SCANNING CAMERA

Filed June 15, 1970                         2 Sheets-Sheet 2

JASPER S. CHANDLER
INVENTOR.

BY
ATTORNEYS

United States Patent Office 3,620,146
Patented Nov. 16, 1971

3,620,146
COMPACT SCANNING CAMERA
Jasper S. Chandler, Rochester, N.Y., assignor to
Eastman Kodak Company, Rochester, N.Y.
Filed June 15, 1970, Ser. No. 46,051
Int. Cl. G03b 37/00
U.S. Cl. 95—15                                      7 Claims

ABSTRACT OF THE DISCLOSURE

A compact camera using film of relatively large image format is provided with a scanning mirror or the equivalent and with a relatively long focal length multiple element lens, the first principal point of which is located at or near the scanning pivot axis of the scanning miror. This arrangement prevents or substantially corrects image smearing caused by the apparent shifting of the lens viewpoint during scanning of the photographed scene and also reduces other types of distortion inherent in scanning cameras of equivalent size by increasing the focal length of the optical system.

BACKGROUND OF THE INVENTION

Field of the invention

The present invention relates to hand-held photographic cameras which are made very compact in relation to the format of the film therein by employing means for scanning a scene and projecting an image thereof through an elongate exposure aperture in transverse relation to the camera film as the latter moves longitudinally in coordination with the movement of the scene scanning means.

Description of the prior art

Cameras for amateur use and to some degree those for professional use have been gradually reduced in film format size over the years. The once popular postcards size film having an exposure area of 3¼ x 5½ inches has been progressively obsoleted by various intermediate smaller film sizes until film of 35 mm. size or the generally equivalent 126 size now predominates. Still smaller "sub-miniature" film sizes are also gaining in popularity, reflecting the desire for convenience, versatility and compactness which has been made possible by improvements in films, lenses, enlargers, projectors, etc.

The single outstanding exception in recent years to this trend toward smaller cameras and film size has been in the field of self-processing cameras which require the film image area to be the same size as the finished print. Because such cameras must be loaded with film assemblages which are much bulkier than the film alone and must also include various processing mechanisms which are absent from conventional cameras, these cameras are in most cases appreciably larger even than relatively ancient conventional cameras adapted to use film of the same format.

To reduce the overall dimensions of a camera using large format film, one possible approach is to reduce the focal length and increase the viewing angle of the camera lens, thereby allowing it to be located closer to the film plane. To provide an acceptable image, any camera lens should be corrected in order that its image will be in sharp focus in coincidence with the flat film plane and will exhibit substantially uniform lateral magnification throughout the image field. In other words, the lens must be relatively free of coma and astigmatic aberrations and must be substantially corrected for Petzval curvature and Seidel distortion. By using modern lens designing techniques and lens materials, lenses of relatively short focal length and wide field of view can be produced economically which are adequately corrected in all these respects. However, although the perspective of the image provided by such a lens may be technically exact, the resulting photograph will not necessarily correspond to the viewer's aesthetic concept of the scene as he would see it. This is because the use of a relatively short focal length lens implies that the camera must be located correspondingly close to the viewed scene whereas the human eye is a relatively long focal length instrument which is normally accustomed to viewing the corresponding scene from a greater distance. Accordingly, the quality of the lens does not alter the generally recognized rule that establishes the diagonal of the film image area as the approximate minimum focal length of the lens employed in an all-purpose camera intended for amature use.

In order to improve the compactness of a camera using self-processing film of large image format without resort to relatively short focal length systems, it has been proposed to provide such a camera with a folded optical path terminating at an elongate narrow exposure aperture adjacent the film in transverse relation thereto. A movable mirror or the equivalent is located in the ray path of the objective lens and pivots about an axis optically parallel to the exposure aperture so that an image of the viewed scene scans the aperture. By moving the film longitudinally past the exposure aperture in timed coordination with the movement of the mirror, successive transverse increments of the film are exposed to images of corresponding successive transverse increments of the viewed scene to produce an uninterrupted film image of the scene. The duration of the film exposure is established by the width of the exposure aperture and by the speed of the film movement relative to the aperture thus eliminating the need for a conventional shutter at the objective lens.

When a conventional camera photographs a scene in a plane parallel to the plane of the film both the object and image distances become increasingly greater with respect to regions of the scene which are progressively more distant in any direction from the central axis of the optical ray path, but the previously mentioned corrections of the lens substantially compensate for this factor to provide sharp focus and uniform lateral magnification throughout the image plane. In a scanning camera of the type just described, however, the distance between the lens and the scene increases at all off-axis viewing angles but the corresponding image paths between the lens and the film plane do not vary in the scanning direction of the film but do vary somewhat in transverse relation to the scanning direction. Accordingly, the resulting image suffers from so-called cylindrical distortion caused by the fact that objects in the scene which lie in a cylindrical surface at a constant distance from the lens are rendered at the same magnification and are in sharp focus whereas objects in a plane parallel to the film plane lack both sharp focus and sufficient magnification toward the edges of the scene image. Furthermore, image rays from a longitudinally off-axis scanning region of the scene are directed onto a transverse region of the film along a path defined by a plane which is normal to the film whereas in a conventional camera the corresponding image rays from the same scene region intersect the film obliquely and therefore cover a wider longitudinal portion of the film. Consequently, the scanning camera also inherently produces so-called oblique distortion which results in progressively compressing the end portions of the scene image only in a longitudinal direction.

As disclosed in U.S. Pat. No. 3,468,229, issued to A. H. Bellows on Sept. 3, 1969, the cylindrical distortion phenomenon can be corrected in such a camer by moving the objective lens both axially and angularly in timed coordination with the scanning movement of the mirror. Since the above described image distortion phenomena are functionally related to the focal length of the camera lens, however, photographs which are entirely acceptable to the average amateur photographer from the standpoint of scene distortion can be produced by such a scanning camera without resort to such elaborate mechanisms simply by employing a lens of relatively long focal length, but still not necessarily longer than the diagonal of the picture. For ordinary scenes the objects are not generally arranged either in a plane parallel to the film plane nor in a cylindrical surface whose center is at the lens but may occur at distances from near to infinity. The lens aperture is such as to produce sufficient depth of focus for the normal angle of view so that there is no practical difference if the surface of sharpest focus is a plane or a cylinder tangent to it at the center of the field.

Another source of image aberration inherent in previously known scanning cameras occurs because the scanning movement of the mirror about a fixed rotational axis produces a continuous change in the apparent viewpoint of the camera lens. In other words, the angular relationship between the lens and an optical ray from a particular point of the viewed scene changes as the mirror scans that point. Since the exposure aperture through which the incremental scene image is projected onto the film is of a finite longitudinal dimension, this phenomenon therefore produces smearing of the resulting image particularly for near objects, each point of which represents the superimposition of multiple images of the same scene point viewed from slightly different angles. Unlike the previously mentioned aberrations, this image smearing phenomenon remains unacceptably apparent in photographs produced by previously known types of scanning cameras of practicable design even though the focal length of the camera lens be sufficiently long to produce photographs which are acceptably free of cylindrical and oblique distortion.

SUMMARY OF THE INVENTION

In accordance with the present invention, a scanning camera generally similar to those described above is provided with a multiple element lens of relatively long focal length, the first principal point of which is located at or near the fixed pivot axis of the scanning mirror. By visualizing such a lens as if it were a simple positive lens physically located at the mirror pivot axis, it will be recognized that the apparent viewpoint of the lens does not change with respect to any particular point of the viewed scene as that point is scanned. Accordingly, the previously described image smearing problem is eliminated or reduced to inconsequential proportions without resort to complicated and expensive mechanisms. More specifically, since the first and second principal points of a multiple element lens generally do not coincide, the invention contemplates locating the first principal point of the lens at or near the pivot axis of the mirror and synchronizing the movement of the film with the movement of the mirror in accordance with the location of the second principal point of the lens.

In addition to avoiding smearing of the film image, the present invention also decreases the distance that must be provided within the camera to accommodate a lens of a particular focal length and thereby allows the camera to be proportionately more compact. Furthermore, in a scanning camera using the type of lens contemplated by the invention, the scanning mirror intercepts the narrowest part of the optical ray path and can therefore be relatively small; thus reducing the space occupied by that element and minimizing the inertial mass that must be accelerated rapidly in precise correlation with the film movement at the start and end of each film exposure.

Various means for practicing the invention and other advantages and novel features thereof will be apparent from the following detailed description of an illustrative preferred embodiment of the invention, reference being made to the accompanying drawings in which like reference numerals denote like elements.

DESCRIPTION OF THE ILLUSTRATIVE PREFERRED EMBODIMENT

Figures 1, 2:
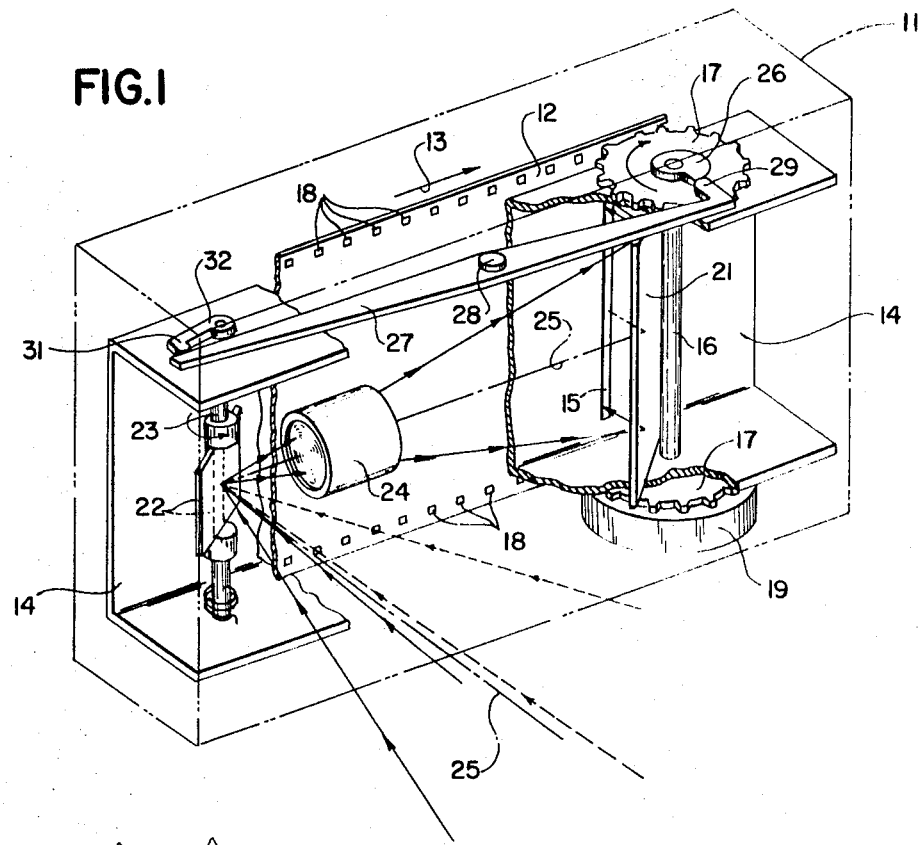
FIG. 1 is a somewhat schematic prespective illustration of a compact scanning camera according to a preferred embodiment of the present invention, in which the camera housing is partially shown in phantom lines and in which those components of the camera unnecessary to understanding the invention have been omitted for purposes of clarity.
FIG. 2 is a diagrammatic representation of the optical system of a prior art scanning camera of the same general type to which the present invention relates.

The illustrative compact scanning camera shown in FIG. 1 of the accompanying drawings is generally similar in the arrangement of its various components to the analogous cameras disclosed in the aforementioned U.S. patent and other related patents. Briefly, the camera includes a housing 11 adapted to accomodate an elongate sheet of relatively large format film 12, which is supported in flat condition for movement in the direction shown by arrow 13 by appropriate support means, now shown. A wall member partially depicted at numeral 14 is located immediately adjacent the front emulsion surface of the film and includes an elongate exposure aperture 15, which provides the only avenue by which light can reach the film.

Drive shaft 16 is rotatably supported by wall member 14 and includes a pair of sprocket wheels 17 in engagement with sprocket perforations 18 along the corresponding edges of the film. Alternatively smooth drive wheels can be used with unperforated film if a suitable free turning pressure roller (not shown) is used to press the film against the drive wheels to provide contact friction to drive the film. A spring powered drive motor, depicted at numeral 19, is connected to drive shaft 16 and is adapted to rotate the latter in a clockwise direction through somewhat less than a single revolution during each film exposure operation, thereby causing the entire exposure area of the film to transverse the exposure aperture as the film moves in the direction shown by arrow 13. As previously mentioned, the present invention is particularly suitable for use in self-processing cameras, but the various additional film components and camera elements which cooperate to effect processing of the film after it has been moved past the image aperture are not illustrated or specifically described inasmuch as those details are not necessary to understanding the invention.

The optical system of the illustrative camera includes a stationary flat mirror 21 located adjacent exposure aperture 15 at an angle of approximately 45 degrees to the film. Toward the opposite end of the camera, an angularly movable flat scanning mirror 22 is carried by mirror shaft 23, the axis of which is substantially coincident with the reflective surface of mirror 22. Shaft 23 is rotatably supported to wall member 14 in parallel relation to the mirror 21 and is adapted to be angularly rotated as described below, to thereby similarly rotate mirror 22 about the axis of that shaft.

The objective lens 24, which comprises the principal distinctive feature of the invention, is mounted between the two mirrors along a horizontal optical axis 25 which is reflected to the center of image aperture 15 by stationary mirror 21 and which intersects the rotational axis of angularly movable mirror 22. As described in detail below, lens 24 comprises both positive and negative lens elements which cooperate to establish the first principal point of the lens beyond the lens elements per se in substantial coincidence with the pivot axis of scanning mirror 22. Accordingly, when the scanning mirror is pivoted in a counter-clockwise direction between its extreme positions shown respectively in solid and broken lines in FIG. 1, a focused image of a scene facing the camera is presented to the film through the exposure aperture as an infinite series of successive vertical scene increments scanning the viewed scene from right to left as seen from the camera. Concurrently, however, the film is moved in the direction shown by arrow 13 at a rate of speed which is accurately correlated with the angular movement of the scanning mirror so that the successive scene increments focused on the moving film provide a continuous exposed film image of the entire scene.

The mechanism employed to correlate the angular movement of the mirror with the simultaneous longitudinal movement of the film comprises a cam 26, which is carried by the upper end of the drive shaft 16 in immovable relation to sprocket wheels 17. A control lever 27 is pivotally supported by stationary stud 28 and is provided with a cam follower nose 29 adapted to bear against the periphery of cam 26. At this opposite end, lever 27 is engaged by the nose portion 31 of an arm 32 attached to the top end of mirror shaft 23. The mirror shaft, in turn, is biased in a counterclockwise direction by spring 33 to maintain the nose portion of arm 32 in contact with lever 27 and thereby to urge the cam follower nose of the latter into peripheral contact with cam 26. Thus, it will be apparent that the profile of cam 26 precisely relates the angular movement of the mirror to the longitudinal movement of the film in accordance with the optical principles discussed below.

In the illustrative camera, the employment of an even number of reflective mirror surfaces in combination with the objective lens causes the exposed film image to be reversed and accounts for the fact that the film moves longitudinally in the same direction in which the viewed scene is scanned. It will be recognized, however, that a rectified film image could be produced, if desired, by providing an odd number of reflective surfaces; for example by employing a pentaprism in place of stationary mirror 21. Also, it should be noted that since the duration of the film exposure is determined by the width of the exposure aperture and by the speed of the longitudinal film movement, no shutter is required in the conventional sense. However, to avoid accidental fogging of the film beyond the sacrificed increment thereof initially aligned with the exposure aperture, it may be desirable to prevent any light from reaching the exposure aperture between exposures by employing an auxiliary capping shutter, not shown.

To illustrate the optical principles with which the present invention is concerned, FIG. 2 is an exaggerated schematic representation of the optical system of a scanning camera of the type previously known, which is similar to the one shown in FIG. 1 except that it employs a conventional objective lens 35 illustrated as a single element lens with its first and second principal points located as shown at $P_1$ and $P_2$. As described above, the objective lens is located between a pivotal scanning mirror 36 and a stationary mirror 37 so that a vertical image of a viewed scene along scene plane 38 is focused on film sheet 39 through elongate exposure aperture 41. In accordance with lens theory, the angle at which any optical ray enters a lens through one of its principal points is equal to the angle at which that ray emerges from the other principal point. Therefore, the horizontal field angle 42 of the lens is the same as the image angle 43 established by the width of aperture 41, which is obviously greatly exaggerated for explanatory purposes.

The scanning mirror is depicted in the three successive positions 36, 36' and 36'' which it instantaneously occupies as incremental images of the corresponding overlapping vertical scene increments 44, 44' and 44'' are focused on the film through aperture 41. When the scanning mirror is at its initial position 36 a scene point X, included in both scene increments 44' and 44'', is focused on the film near the left edge of the exposure aperture as shown at $X_a$. As the mirror moves in a counterclockwise direction, the image of point X moves in synchronism with the moving film so that it is located near the right edge of the exposure aperture, as shown at $X_b$, when the mirror is at its intermediate position 36'. Similarly, the image of scene point Y included in both scene increments 44' and 44'' is located at $Y_a$ when the mirror is in position 36' and moves in synchronism with the film to position $Y_b$ as the mirror rotates to its final position 36''.

As previously mentioned, this type of scanning camera inherently produces an image with at least some degree of focusing error and both cylindrical and oblique distortion, but such image aberrations can be disregarded for many amateur photographic purposes if the lens is of relatively long focal length. For example, scene increments of equal height in transverse relation to the scanning direction are shortened as a function of the cosine of the horizontal half field angle from the center of the viewed scene, but this shortening is not noticeably objectional in a photograph having a conventional height to width ratio. The present invention, however, is principally directed to the much more significant image aberration which results from the fact that the effective viewpoint of lens 35 moves relative to the viewed scene as a function of the angular position of the scanning mirror. In other words, as depicted in FIG. 2, the lens, in effect, "sees" scene increments 44, 44' and 44'' from three different viewpoints V, V' and V'' when the scanning mirror is in its three corresponding angular positions 36, 36' and 36''. For example, the viewpoint from which scene point X is observed, changes from V to V'' as the image of that point traverses the exposure aperture from $X_a$ to $X_b$ in synchronism with the film. Consequently, both the focused image of scene point X and the perspective relation thereof to other adjacent image points change accordingly during the film exposure. As a result, even though the camera may be capable of producing photographs which are acceptable with regard to the previously described distortion and focus errors, this shifting viewpoint phenomenon can cause a very noticeable smearing of the overall film image.

Figure 3:
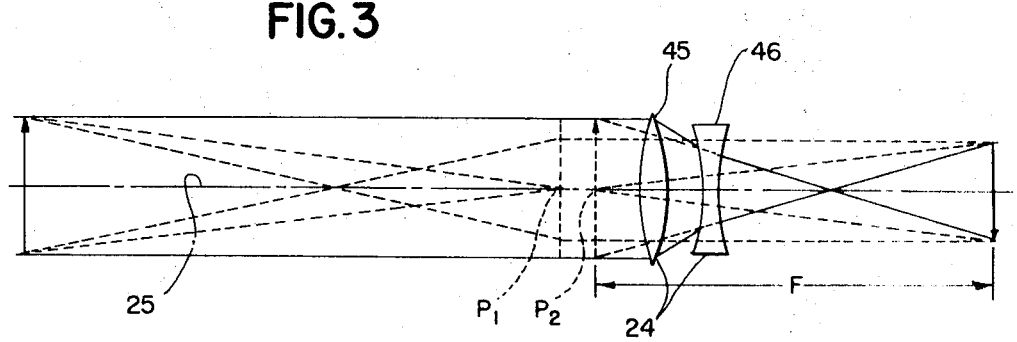
FIG. 3 is a simplified illustration of the type of lens employed in the camera shown in FIG. 1.
Figure 3:
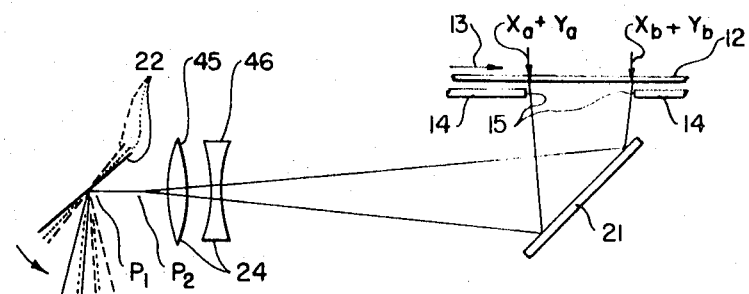
Figure 4:
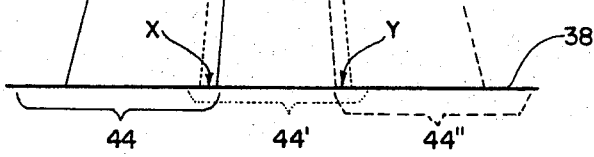
FIG. 4 is a diagrammatic representation corresponding generally to FIG. 2, but depicting the optical system of the illustrative camera shown in FIG. 1.

In accordance with the present invention, the above-described image smearing problem is eliminated or reduced to insignificant proportions by the simple but heretofore unobvious expedient of locating the first principal point of the camera lens at or near the axis of rotation of the scanning mirror. As shown in FIG. 3, the lens 24 of the illustrative camera according to the present invention is of the so-called telephoto type comprising a position lens element 45 and a negative lens element 46 which are combined so that the negative element slightly diverges the converging image rays emerging from the positive lens element. This lens elements arrangement, therefore, causes the first and second principal points $P_1$ and $P_2$ of lens 24 to be located forwardly of the lens elements and effects a corresponding increase in the lens focal length F. As shown in FIG. 4, which depicts the apparent paths of representative object and image rays passing through the principal points of lens 24, the first principal point $P_1$ of that lens is located exactly at the rotational axis of scanning mirror 22. Therefore, the angular rotation of that mirror has no influence on the viewpoint of the camera lens, which is always at the rotational axis of the mirror. Consequently, the image of any given scene point and its perspective relation to other scene points remain unchanged as the corresponding incremental scene image transverses the exposure aperture in synchronism with the film movement in the same manner explained in connection with FIG. 2. Ideally, the first principal point of the lens should coincide exactly with the pivot axis of the mirror, as just described, but it should be recognized that some deviation can be tolerated without producing an objectionable degree of image smear; thereby allowing the lens to be adjusted along its axis for focusing purposes. Since the image rays may be considered as emerging from the second principal point $P_2$ of lens 24, the correlation between the movement of the mirror and the simultaneous movement of the film is determined in accordance with the position of that principal point to equate the instantaneous angular scanning movement of the object and image rays, thereby insuring synchronism between the movement of the film and the corresponding movement of the incremental scene image focused thereon. Theoretically, the film should move past the exposure aperture along an arcuate plane having its axis in optical coincidence with the second principal point $P_2$ of lens 24, but it can be demonstrated that the slight image error resulting from the illustrated flat film plane is inconsequential for practical purposes.

In addition to avoiding the problem of image smearing attributable to viewpoint shifting, the invention also facilitates improving the compactness of a scanning camera by allowing the optical distance between the scanning mirror and the exposure aperture to be shorter than would be possible if a conventional lens were employed. For example, by comparing FIGS. 2 and 4, in which the respective scanning mirrors and exposure apertures occupy the same relative positions, it will be seen that the improved camera shown in the latter figure has a lens of appreciably longer focal length and correspondingly narrower longitudinal angle of view. Therefore, if the focal length of lens 24 were reduced to that of lens 35 to provide the same viewing angle, the camera illustrated in FIG. 4 could obviously be made significantly narrower than the one shown in FIG. 2.

Still another advantage of the camera represented in FIG. 4 as compared to the one illustrated in FIG. 2 will be recognized by comparing the relative sizes of the respective scanning mirrors shown in those two figures. In the camera illustrated by FIG. 2, the size of the scanning mirror is determined by its distance from the first principal point of lens 35 to insure that it is large enough to intercept and reflect all optical rays coming to the lens from any scene increment. In the improved camera, however, mirror 22 is located at the narrowest part of the optical ray path which represents the effective aperture stop of lens 24. Accordingly, the latter mirror can be substantially smaller and lighter than the former and can be accelerated angularly with correspondingly less force. In a camera having a fixed aperture stop, the size of the scanning mirror or of the reflective surface thereof can be utilized to define the aperture stop. If a variable aperture diaphragm is employed, it obviously would be located as close as possible to the mirror axis.

Although the illustrative embodiment of the present invention embodies a telephoto type lens between the scanning mirror and the exposure aperture, it should be apparent that the image smearing phenomenon could also be avoided in a somewhat less compact scanning camera by utilizing a lens physically located forwardly of the scanning mirror but designed so that its first principal point is located rearwardly of the lens elements at or near the mirror axis. Similarly, the same essential proximity between the mirror pivot axis and the first principal lens point could be achieved by a lens having elements at opposite sides of the mirror. Furthermore, it should be realized that the invention could also be employed in a camera in which optical scanning is achieved other than by means of a movable reflective surface; for example, by pivotally moving the camera lens itself about a pivot axis substantially coincident with the first principal point of that lens.

The invention has been described in detail with particular reference to illustrative preferred embodiments thereof, but it will be understood that variations and modifications can be effected within the spirit and scope of the invention as described hereinabove and as defined in the appended claims.

I claim:

1. In a scanning camera adapted to accommodate a photosensitive film sheet, said camera including:
   aperture means defining an exposure aperture adjacent and in transverse relation to said film sheet accommodated by said camera;
   movement producing means for producing relative longitudinal movement between said exposure aperture and said film sheet; and
   optical means including a lens, said optical means being adapted to image an increment of a viewed scene on said film sheet through said exposure aperture; the improvement comprising:
   movable scanning means operable simultaneously with said movement producing means for angularly moving an optical element of said optical means about a pivot axis substantially coincident with the first principal point of said lens to thereby cause images of successive increments of a viewed scene to be focused on said film sheet through said exposure aperture.

2. The invention defined by claim 1 including coordinating means operatively connecting said movement producing means and said movable scanning means to effect predetermined coordination between the relative longitudinal movement of said film sheet with respect to said exposure aperture and the simultaneous angular movement of said optical element in accordance with the spatial relationship of the second principal point of said lens to said exposure aperture.

3. The invention defined by claim 2 in which said optical element comprises an angularly movable reflective member located along the optical axis of said lens.

4. In a scanning camera adapted to accommodate a photosensitive film sheet, said camera including:
   aperture means defining an exposure aperture adjacent said film sheet accommodated by said camera in transverse relation thereto; and
   film moving means for moving said film sheet longitudinally past said exposure aperture; the improvement comprising:
   optical means adapted to image an incremental portion of a viewed scene on said film sheet through said image aperture, said optical means including
      (1) a scanning member supported for angular movement about a fixed pivot axis and
      (2) a lens comprising a plurality of lens elements cooperating to define the first principal point of said lens beyond the physical location of any of said lens elements in substantial coincidence with said pivot axis of said scanning member; and
   drive means operable simultaneously with said film moving means for moving said scanning member angularly about said pivot point.

5. The invention defined by claim 4 including coordinating means for coordinating the longitudinal movement of said film sheet and the simultaneous angular movement of said scanning member in accordance with a functional relationship determined by the relative position of the second principal point of said lens with respect to said exposure aperture.

6. The invention defined by claim 4 in which said scanning member comprises an angularly movable mirror.

7. The invention defined by claim 4 in which said lens is located along the portion of the optical axis of said optical means between said scanning member and said exposure aperture.

References Cited

UNITED STATES PATENTS

| 2,794,379 | 6/1957 | McNeil | 95—16 |
| 3,537,373 | 11/1970 | Land | 95—15 X |

SAMUEL S. MATTHEWS, Primary Examiner

R. L. MOSES, Assistant Examiner

U.S. Cl. X.R.

350—202